May 7, 1968  MITSUO HASEGAWA ET AL  3,382,344
AUTOMATIC WELDING MACHINE
Filed Jan. 12, 1965  4 Sheets-Sheet 1

FIG. 1
FIG. 2

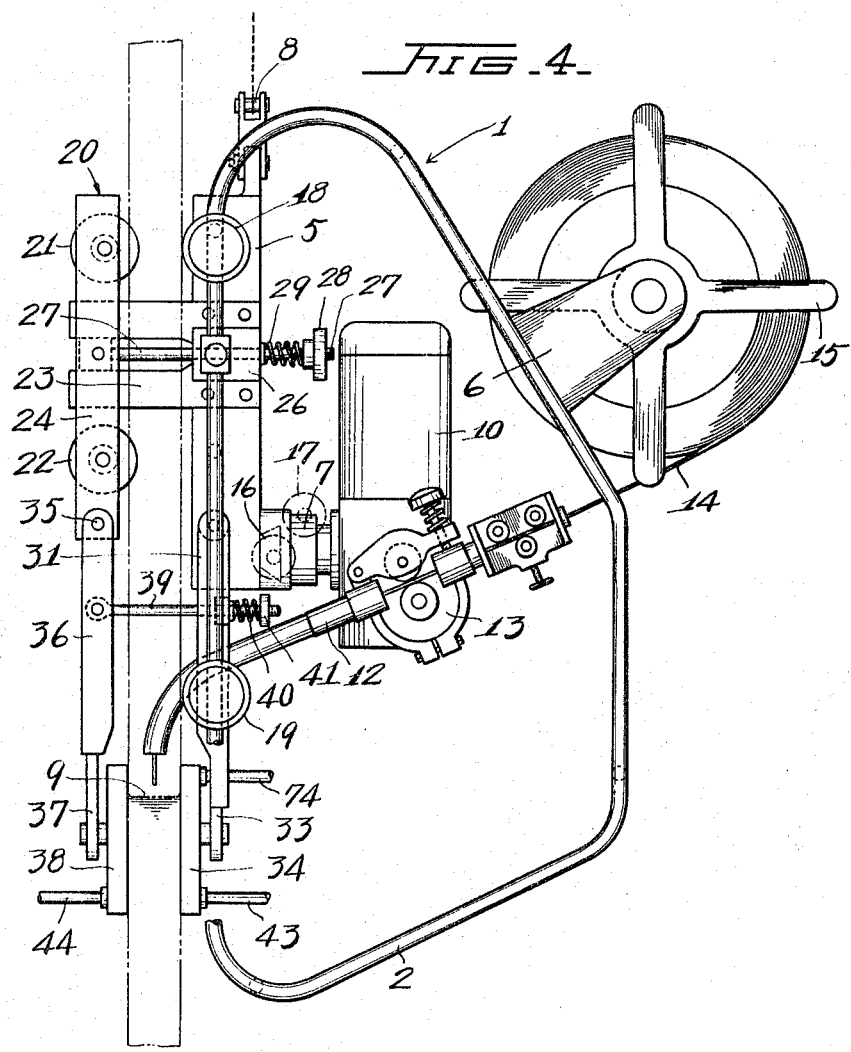

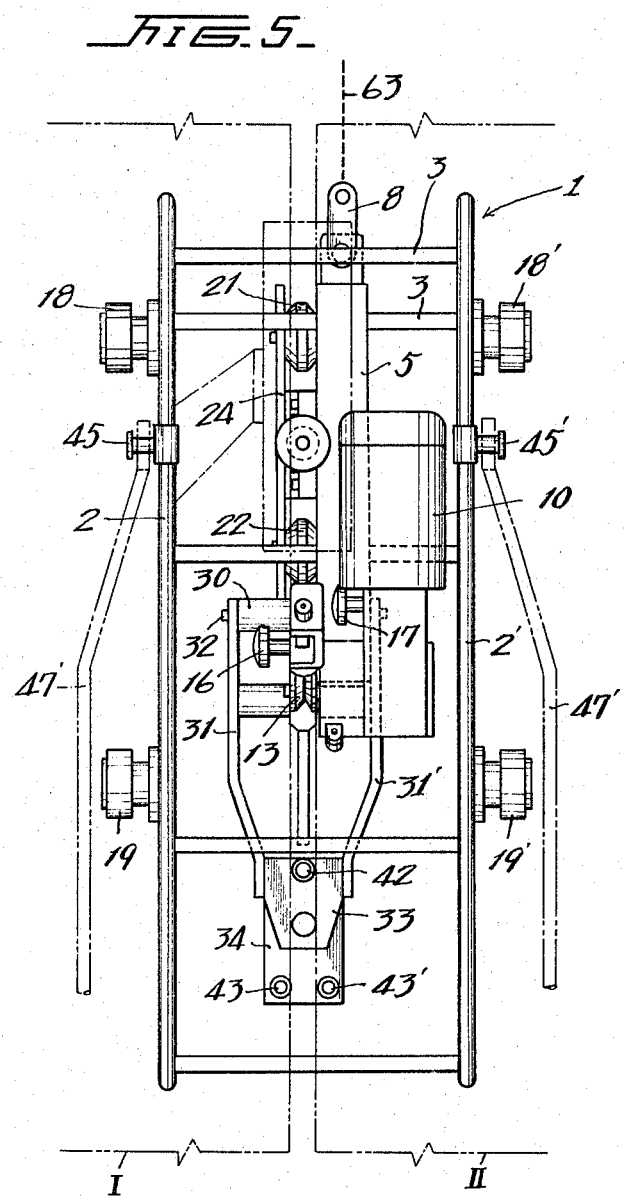

May 7, 1968   MITSUO HASEGAWA ET AL   3,382,344
AUTOMATIC WELDING MACHINE
Filed Jan. 12, 1965   4 Sheets-Sheet 4

United States Patent Office 3,382,344
Patented May 7, 1968

3,382,344
AUTOMATIC WELDING MACHINE
Mitsuo Hasegawa, 3 4-chome, Chitose-Dohri, Toyanaka, Ohsaka-fu, Japan, and Hideo Ikkai, 755 Yokoya, Uozaki-machi, Higashi Nada-ku, Kobe, Japan
Filed Jan. 12, 1965, Ser. No. 424,938
Claims priority, application Japan, Jan. 21, 1964, 39/2,509
2 Claims. (Cl. 219—126)

ABSTRACT OF THE DISCLOSURE

An automatic welding machine for welding a pair of vertically disposed workpieces arranged in spaced edge-to-edge confrontation so as to define an open seam therebetween. The vertical welding machine has a carriage which carries an electrode centered in the open vertical seam being welded. The electrode is maintained in a central position of the open seam by a roller mechanism attached to the carriage and which prevents lateral movement of the carriage. The roller mechanism comprises a first set of rollers attached to the carriage at one side of the workpieces and bearing against the faces thereof and a second set of bevel edge rollers located at the opposite side of the workpieces and having their bevel edges engaging the corner edges of the workpieces, the bevel edge rollers also being fixedly connected with the carriage. The carriage is suspended from supporting structure including hoisting means for raising and lowering the carriage to move the electrode along said open seam.

The present invention relates to an improved automatic welding machine which is adapted to automatically weld workpieces laid in vertical or inclination by the utilization of arc heat or resistance heat generated by molten slag, and the improved automatic welding machine finds its application in welding workpieces having curved surfaces such as the walls of spherical storage tanks and hulls of ships as well as workpieces having flat surfaces.

Up to now workpieces laid in vertical and inclination have been welded by either the so-called "electroslag" welding method in which copper backings are employed for prevention of flowing out of molten metal or the gas shielded arc welding method by automatic welding machines and these conventional methods have succeeded in obtaining satisfactory weldments laid in vertical to some extents. However, when the conventional welding machines are employed for welding workpieces having curved surfaces or laid in inclination, it was very difficult to move the welding heads along the curved or inclined seam lines, and furthermore, the conventional welding machines are of large sizes and heavy weights which make handling of such machines inconvenient and expensive. Because of the above disadvantages, the conventional automatic welding machines have not been widely employed as practical apparatus for automatic welding.

Accordingly, one object of the present invention is to provide an improved automatic welding machine which has a simple construction and is easy in handling, and in which the welding head and follower mechanism are mounted on a carriage which is supported in suspension by a hoist mechanism in such a manner that the carriage may move along the seam line between spaced workpieces laid in vertical or inclination whereby the welding head may positively move along the seam line either in case the workpieces have flat surfaces or curved surfaces.

According to the present invention, there is provided an automatic welding machine which comprises a carriage on which a welding head is mounted and which is supported in suspension by a hoist mechanism in such a manner that the carriage may move along the seam line between spaced workpieces laid in vertical or inclination and the carriage includes a guide mechanism comprising rolls adapted to contact with one surface of the workpieces, and a follower mechanism adapted to contact with the other surface of the workpieces, and the follower mechanism and the carriage are connected by mechanical means in such a manner that the welding head may be normally maintained at a proper welding position.

According to the present invention, when the hoist mechanism which supports the carriage in suspension is actuated, the carriage moves along the workpieces whereby the follower mechanism of the carriage may move along the seam line between the workpieces and the guide mechanism comprising rolls may move along the other surfaces of the workpieces, and the wire electrode fed through the nozzle electrode of the welding head is positively positioned at substantially center line of the seam line between the workpieces so that the seam line is welded as the carriage moves upwardly, and therefore, even if the workpieces are laid in vertical or inclination the welding operation can be effected with a high efficiency. Because of the adaptability of the carriage to either flat or curved surfaces of workpieces, the welding machine can easily weld curved workpieces such as spherical tanks, the bows and sterns of ships which have curved surfaces as well as workpieces having flat surfaces and since the welding machine is of simple construction, small size, light weight and easy in handling, such a welding machine can be manufactured with less expense as compared with the conventional welding machines.

The above and other objects and advantages of the present invention will be more readily apparent from the following description when read in connection with the accompanying drawings and in which:

FIG. 1 is a side elevational view of an automatic welding machine representing a preferred embodiment of the present invention;

FIG. 2 is a fragmentary front elevational view of the hoist mechanism shown in FIG. 1;

FIG. 3 is a cross-sectional view taken along generally the line X—X of FIG. 2;

FIG. 4 is a fragmentary side elevational view on an enlarged scale of the body or carriage of the welding machine shown in FIG. 1;

FIG. 5 is a front view of the body shown in FIG. 4;

Figure 6:
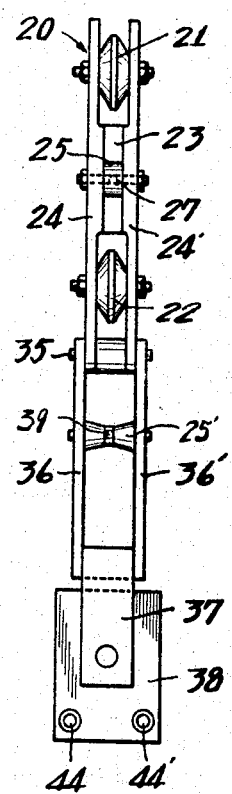
FIG. 6 is a fragmentary view of the follower mechanism for guiding the body along the seam line between workpieces to be welded by the welding machine of the present invention.

Referring to FIGS. 1, 4 and 5, an automatic welding machine of the present invention comprises a carriage 1 which constitutes the body of the welding machine and on which a welding head 10, a controlling mechanism 11 and a wire reel 15 are mounted by suitable means. The carriage or body 1 is suspended from a hoist mechanism 50 which is adapted to be mounted on the two workpieces I and II which are disposed in vertical or inclination providing a suitable space or gap therebetween. The carriage 1 is adapted to move upwardly and downwardly with respect to the workpieces I and II.

The carriage 1 has identical tubular frame members 2 and 2' on the opposite sides thereof and the frame members are in the form of loops and have straight portions which face the workpieces I and II and rearwardly extending bent portions, respectively.

The straight frame portions are connected to each other by a plurality of cross bars 3 extending therebetween. A welding head holding member 5 is secured to some of the cross bars 3. The bent portion of the tubular frame members 2 mounts the wire reel 15 by bracket of a support means 6. The welding head holding member 5 and the welding head 10 are connected by a mount assembly 7 and the mount assembly includes a first positioning means 16 and a second positioning means 17. The first positioning means 16 is adapted to adjust the position of the welding head 10 forwardly and backwardly with respect to the carriage 1 whilst the second positioning means 17 is adapted to adjust the position of the welding head 10 leftwardly and rightwardly with respect to the carriage 1.

The welding head 10 includes a wire feed mechanism 13 which continuously feeds a roll of wire electrode 14 wound around the wire reel 15 toward the workpieces via a nozzle electrode 12. When the wire feed mechanism 13 is actuated, the wire electrode 14 is fed toward the weld puddle 9 between the workpieces I and II thereby to provide an arc between the wire electrode 14 and the workpieces.

Figure 7:
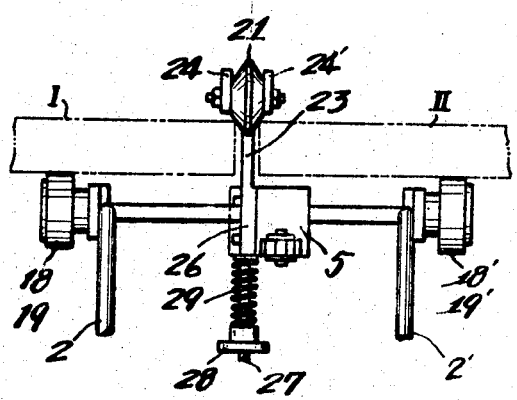
FIG. 7 is a partial plan view showing the manner in which the follower mechanism of FIG. 6 moves along the seam line between workpieces in contact therewith.

The tubular frame members 2 and 2' of the carriage 1 are provided with a pair of upper and lower guide rolls 18, 18' and 19, 19' which moves along one side of the respective workpieces. A follower assembly 20 is provided on the carriage 1 and the follower assembly has upper and lower level-edge rolls 21 and 22 which are adapted to move in contact with the both edges of the workpieces opposite to those with which the guide rolls contact. The welding head holding member 5 on the carriage 1 has a guide piece 23 secured thereto which extends through the abutting gap between the workpieces. The guide piece 23 has plate members 24 and 24' on the opposite surfaces thereof as seen in FIG. 6 and these plate members are adapted to slide on the respective sides of the guide piece 23. The follower rolls 21 and 22 are supported between the plate members 24 and 24' by bolts extending through the plate members. An insert member or spacer 25 is secured to and between the inner sides of the plate members 24 and 24' at a substantially mid point in the length of the plate members by any suitable means such as bolts or welding. The insert member 25 and the carriage 1 are connected by a threaded connecting rod 27 passing through the projection 26 of the welding head mounting member 5. A spring 29 is disposed around the threaded connecting rod 27 and the spring 29 is compressed by an adjusting screw 28 which threads on the rod 27. The action of the spring 29 is to draw the follower rolls 21 and 22 toward the edges of seam between the workpieces I and II and at the same time to urge the guide rolls 18, 18' and 19, 19' against the opposite surfaces of the workpieces I and II as shown in FIG. 7. Accordingly, the driving of the hoist mechanism 50 causes the follower rolls 21 and 22 of the carriage 1 to move upwardly along the edges of the seam in contact therewith and to move the guide rolls 18, 18' and 19, 19' along the other surfaces of the workpieces in contact therewith, and thus, the nozzle electrode 12 of the welding head 10 normally travels substantially along the center line of the seam between the edges of the workpieces.

A projection 30 is provided on the welding head mounting member 5 on the carriage 1 and the projection has two opposite plate members 31 and 31' pivotally secured thereto by means of a pin 32 as seen in FIG. 5. A support plate 33 is welded to and between the inner sides of the plate members 31 and 31' at their lower ends and a slide backing 34 is secured to the support plate 33 by any suitable means. The slide backing 34 comprises a water-cooled copper plate, for example, and is adapted to contact with one surface of the workpieces. Plate members 36 and 36' are pivotally mounted at the lower ends of the respective plate members 24 and 24' of the follower mechanism 20 by means of a pin 35 as shown in FIG. 6. A backing support member 37 is welded to and between the inner sides of the plate members 36 and 36' at their ends and a slide backing 38 is secured to the backing support member 37. The slide backing 38 comprises a water-cooled copper plate, for example, and is adapted to contact with the sides of the workpieces in the vicinity of the edge of seam between the workpieces. Since the plate members 36 and 36' for supporting the slide backing 38 and the plate members 31 and 31' for supporting the slide backing 34 are connected by a spacer 25' and a threaded connecting bar 39 transversely extends through the spacer, and furthermore a compression spring 40 is threaded on the connecting bar 39, the slide backings 34 and 38 are urged against the vicinity area of the seam line or edges of the workpieces I and II with a moderate pressure by the spring. The pressure acting on the slide backings 34 and 38 by the compressing spring 40 can be adjusted by means of an adjusting screw 41 secured at the rear end of the bar 39.

As shown in FIGS. 1, 2 and 3, the hoist mechanism 50 from which the carriage 1 is suspended comprises a support member 51 adapted to be detachably mounted on the workpieces, an electric motor 60 mounted on the top of the support member 51 and having an upper chain pulley 61 mounted on the motor and a lower chain pulley 62 mounted on the side of the support member 51. A chain 63 is trained around the chain pulleys 61 and 62 and the chain 63 has a hook 8 secured at one end thereof and a counter-weight 64 secured at the other end. With the above arrangement, when the electric motor 60 is driven, the carriage 1 is caused to move along the workpieces.

The support member 51 is made in the form of a reversed U-shape as shown in FIG. 3 and has opposing legs 51' and 51" having a rectangular cross-section. The lower end portions of the legs 51' and 51" are cut away so as to form a pair of holding pieces 52 and 53, respectively, for receiving the workpieces I and II. Rollers 54 and 54' are mounted on the shafts extending through the holding pieces 52 and 53 and these rollers are adapted to contact with the upper ends of the respective workpieces I and II. The provision of the rollers 54 and 54' enables the hoist mechanism 50 which straddles the workpieces I and II to move either in the forward or backward direction with respect to the workpieces I and II (as seen in FIG. 1) so that the position of the hoist mechanism 50 can be adjusted and once the hoist mechanism 50 is adjusted to a proper position, the mechanism 50 is fixed at the adjusted position on the workpieces I and II by means of several screws 55 and 56 threaded into the respective holding pieces 52 and 53. The legs 51' and 51" of the suport member 51 have opposing plate members 57 and 57' which are welded to the inner sides of the respective legs at their one edge and extend inwardly toward each other leaving a clearance therebetween. L-shaped members 59 and 59' having adjustable screws 58 and 58' are secured to the respective plate members 57 and 57'.

Power for the automatic welding machine of the present invention is supplied from a power source 70 through cables 71 and 72 which lead to the nozzle electrode 12 and the workpieces, respectively, as shown in FIG. 1 and the arrangement of the power supply system is the same as in the prior automatic welding machines. A hose 74 which is connected to a shielding gas container 73 leads to the gas spouting bore 42 formed in the slide backing 34 and shielding gas is supplied to the weld puddle 9 via the gas spouting bore 42. The slide backings 34 and 38 are further provided with cooling water inlets 43 and 44 and cooling water outlets 45' and 44', respectively. The cooling water inlets 43 and 44 are connected with any suitable cooling water supply source (not shown) and the cooling water is supplied from the supply source through inlets 43 and 44 to the respective slide backings.

In the operation of the novel automatic welding machine as described above, the hoist mechanism 50 is mounted on the top of the workpieces I and II as shown in FIG. 1 and the carriage 1 is hung on the hook 8 on the chain 63. Thereafter, the follower rolls 21 and 22 are caused to contact with the edges of plates between the workpieces I and II and at the same time the guide rolls 18, 18' and 19, 19' are urged against the other surfaces of the workpieces as shown in FIG. 7. In such a case, the contacting pressure acting on the workpieces by the follower and guide rolls can be adjusted by the adjustment screw 28 which acts on the spring 29. The contacting pressure acting at the area surrounding the weld puddle 9 by the slide backings 34 and 38 can be also adjusted by the adjustment screw 41 which acts on the spring 40 so that the contacting pressure on the both surfaces of the workpieces by the slide backings can be maintained at a suitable level. Then, the position of the welding head 10 is adjusted by the first and second positioning means 16 and 17 and the nozzle electrode 12 is positioned in a proper position. The nozzle electrode 12 and the workpieces are supplied with current from the power supply 70 through the cables 71 and 72 thereby to provide an arc therebetween and at the same time the shielding gas is supplied toward the arc in a surrounding relation thereto from the gas container 73 through the slide backing gas bore 42 thereby to start the welding operation.

As the welding operation goes on, the follower rolls 21 and 22 of the carriage 1 which is driven by the electric motor 60 move upwardly along the edges of plates between the workpieces and the guide rolls 18, 18' and 19, 19' also move upwardly along the other surfaces of the workpieces, and therefore, the nozzle electrode 12 can positively move upwardly along the seam line of the workpieces thereby to insure a correct vertical welding.

After the completion of the welding operation, the screw 28 on the connecting rod 27 which abuts against the follower rolls 21 and 22 is loosened, and similarly, the screw 41 on the connecting rod 39 which abuts against the slide backings 34, 38 is loosened whereby the follower rolls and slide backings are retreated from the respective surfaces of the workpieces and the support member 51 of the hoist mechanism 50 may be removed from the workpieces. In case the vertically disposed workpieces are welded along their whole height, the space T formed between the respective plate members 57, 57' and the L-shaped members 59, 59' of the support member 51 is adjusted by the adjustment screws 58 and 58', respectively, so as to make the space T correspond to the thickness of different workpieces to be welded and the follower rolls 21 and 22 of the carriage 1 are guided along the clearance between the opposing plate members 57 and 57'. In such a case, since the guide rolls 18, 18' and 19, 19' roll along one surface of the plate members 57 and 57' and the follower rolls 21 and 22 move along the clearance between the L-shaped members, the plate members should have a length corresponding to the length H of the novel welding machine. However, in practice, the plate members 57, 57' and the L-shaped members 59, 59' are provided with notches at their lower ends straddling the clearance therebetween. Within the notches, very small end plates having a height h I and II' are disposed as indicated with dotted lines in FIGS. 2 and 3 and these end plates are adapted to contact with the upper surfaces of the workpieces. Thus, in order to weld beyont the length of the workpieces by a distance equal to the height h of the small end plates I' and II'', the carriage 1 may be guided along the center clearance between the plate members 57 and 57'. With the above arrangement, the plate members 57, 57' and L-shaped members 59, 59' can be effectively prevented from being welded, and accordingly, the support member 51 of the hoist mechanism 50 merely acts to guide the carriage 1.

The tubular frame members 2 and 2' of the carriage 1 have bent bars 47 and 47' secured thereto by means of mounting means 45 and 45' welded to the respective frame members 2 and 2' as seen in FIG. 5 and a platform 46 is supported by the bent bars 47 and 47'.

The frames 48 of the platform 46 are welded to the bent bars 47 and 47' to be supported thereby and the lower ends of the bent bars 47 and 47' have wheels 49 which roll along one surface of the workpieces in contact therewith. An operator rides on the platform 46 when he operates the machine. Accordingly, the operator on the platform 46 actuates the controlling device 11 to initiate the welding operation and the welding can be easily effected along the long seam line of high workpieces. Since the chain 63 has the balance weight 64 at its lower one end, the electric motor 60 for the hoist mechanism 50 is not required to provide a great amount of output. The upward movement of the carriage 1 may be also effected by such an arrangement in which the electric motor 60 is mounted on the carriage 1 and the chain 63 is secured to the workpieces at its lower end whereby the chain may be drawn up as the electric motor 60 is driven.

Figure 8:
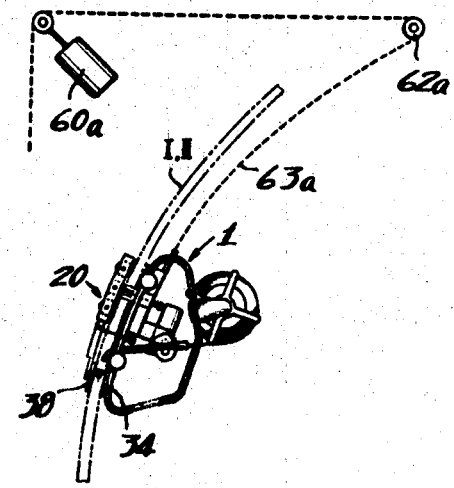
FIG. 8 is a side elevational view of an alternative welding machine representing a modified embodiment of the present invention.

FIG. 8 is a fragmentary view on a reduced scale of a modified welding machine which is adapted to weld a curved seam line. As shown in this figure, the chain 63a for supporting the carriage 1 in suspension is trained around an auxiliary chain pulley 62a and is adapted to be driven from a remotely disposed electric motor 60a through the chain pulley 62a. With the above arrangement, the welding can be effected from one side or the other side of the beveling.

In the foregoing, description has been made of welding machines in which the carriages are provided with upper and lower follower rolls which contact with the edges of plates and with guide rolls which roll in contact with the other sides of the workpieces, but the present invention in not limited to such a construction of the carriages. Alternatively, the follower rolls moving along the edges of plates, and similarly, the guide rolls may also be substituted by guide members other than described above to attain the same objects. Furthermore, the carriage may be provided with two or more wire reels so that the welding may be continued without interruption even if one wire is consumed. And it is also possible that the wire reel may be positioned at any suitable place such as at the ground other than on the carriage.

In addition, the novel welding machine may be applicable to any arc welding method in which a bare wire electrode, a covered wire electrode or a cored wire electrode is employed in the open air or in a shielding gas sheath, the so-called electro-slag welding method, or any other fusion-welding methods in which resistance heating of molten slag is employed.

While two specific embodiments of the present invention have been shown and described in detail, it will be understood that they are for the purpose of illustration only and are not to be taken as a definition of the scope of the invention, reference being had for this purpose to the appended claims.

What is claimed is:

1. In an automatic welding machine for welding a pair of vertically disposed workpieces arranged in spaced edge-to-edge confrontation so as to define an open seam therebetween, said machine comprising
   supporting structure mounted on the top of said workpieces,
   a carriage suspended from said supporting structure at one side of said workpieces, a welding head mounted on said carriage, and
   a nozzle electrode carried by said welding head and extending into said open seam, said supporting structure including hoisting means for raising and lowering said carriage to move said nozzle electrode along said open seam during the course of welding operations, the combination of
guide mechanism for preventing lateral movement of said carriage during said welding operations to thereby maintain said nozzle electrode positioned centrally of said open seam, said guide mechanism comprising first roller means carried by said carriage and engaging said one side of said workpieces at locations symmetrical of said open seam, and second roller means engaging the confronting edges of said workpieces at the side of said workpieces remote from that engaged by said first roller means, said second roller means being fixedly interconnected with said carriage.

2. The welding machine of claim 1 wherein said second roller means comprises at least two vertically spaced bevel-edge rollers each having a pair of converging edges engaging corresponding edges of said workpieces, and wherein said bevel edge rollers are fixed in a frame connected with a plate extending through said open seam, said plate bing fixed to said carriage.

References Cited
UNITED STATES PATENTS

| | | | |
|---|---|---|---|
| 2,866,078 | 12/1958 | Ballentine et al. | 219—126 |
| 2,969,454 | 1/1961 | Lucey | 219—126 |
| 3,134,014 | 5/1964 | Shupp | 219—126 |
| 3,164,714 | 1/1965 | Swan et al. | 219—126 |
| 3,235,705 | 2/1966 | Agnew et al. | 219—126 |
| 3,241,229 | 3/1966 | Turbett | 219—126 |
| 3,255,944 | 6/1966 | Yadron et al. | 219—126 |

RICHARD M. WOOD, *Primary Examiner.*

W. D. BROOKS, *Assistant Examiner.*